(12) United States Patent
Baptist et al.

(10) Patent No.: US 10,091,298 B2
(45) Date of Patent: Oct. 2, 2018

(54) ENHANCING PERFORMANCE OF DATA STORAGE IN A DISPERSED STORAGE NETWORK

(71) Applicant: International Business Machines Corporation, Armonk, NY (US)

(72) Inventors: Andrew D. Baptist, Mt. Pleasant, WI (US); Greg R. Dhuse, Chicago, IL (US); Ravi V. Khadiwala, Bartlett, IL (US)

(73) Assignee: International Business Machines Corporation, Armonk, NY (US)

(*) Notice: Subject to any disclaimer, the term of this patent is extended or adjusted under 35 U.S.C. 154(b) by 52 days.

(21) Appl. No.: 15/166,854

(22) Filed: May 27, 2016

(65) Prior Publication Data

US 2017/0346898 A1    Nov. 30, 2017

(51) Int. Cl.
*G06F 11/08* (2006.01)
*H04L 29/08* (2006.01)
(Continued)

(52) U.S. Cl.
CPC ........ *H04L 67/1097* (2013.01); *G06F 3/0605* (2013.01); *G06F 3/067* (2013.01);
(Continued)

(58) Field of Classification Search
CPC ..... H04L 67/1097; H04L 63/06; G06F 3/067; G06F 3/0659; G06F 3/0619;
(Continued)

(56) References Cited

U.S. PATENT DOCUMENTS 4,092,732 A    5/1978    Ouchi
5,454,101 A    9/1995    Mackay et al.
(Continued)

FOREIGN PATENT DOCUMENTS

CN    103067471 A    4/2013

OTHER PUBLICATIONS

Apr. 29, 2016, U.S. Appl. No. 15/142,297.
(Continued)

*Primary Examiner* — Le H Luu
(74) *Attorney, Agent, or Firm* — Garlick & Markison; Timothy W. Markison (57) ABSTRACT

A method includes determining a level of confidence regarding a revision level for a set of encoded data slices. The method further includes, when the level of confidence is equal to or above a confidence threshold, sending write and commit requests, wherein a write and commit request includes an encoded data slice, a current revision value, and a new revision value. The method further includes, when favorable responses have been received, issuing finalize write requests. The method further includes, when the level of confidence is below the confidence threshold, sending write requests, wherein a write request includes the encoded data slice of the set of encoded data slices and a new revision value. The method further includes, when favorable write responses have been received, issuing write commit requests. The method further includes, when favorable write commit responses have been received, issuing finalize write requests.

22 Claims, 7 Drawing Sheets

(51) Int. Cl.
*G06F 3/06* (2006.01)
*G06F 17/30* (2006.01)
*G06F 11/10* (2006.01)

(52) U.S. Cl.
CPC .......... *G06F 3/0619* (2013.01); *G06F 3/0644* (2013.01); *G06F 3/0659* (2013.01); *G06F 11/08* (2013.01); *G06F 11/106* (2013.01); *G06F 17/30377* (2013.01)

(58) Field of Classification Search
CPC ........ G06F 3/0605; G06F 3/0644; G06F 3/06; G06F 11/08; G06F 11/106; G06F 11/1092; G06F 11/1435; G06F 11/2094; G06F 17/30377; G06F 17/30194; G06F 9/526
See application file for complete search history.

(56) References Cited

U.S. PATENT DOCUMENTS

| | | | |
|---|---|---|---|
| 5,485,474 | A | 1/1996 | Rabin |
| 5,774,643 | A | 6/1998 | Lubbers et al. |
| 5,802,364 | A | 9/1998 | Senator et al. |
| 5,809,285 | A | 9/1998 | Hilland |
| 5,890,156 | A | 3/1999 | Rekieta et al. |
| 5,987,622 | A | 11/1999 | Lo Verso et al. |
| 5,991,414 | A | 11/1999 | Garay et al. |
| 6,012,159 | A | 1/2000 | Fischer et al. |
| 6,058,454 | A | 5/2000 | Gerlach et al. |
| 6,128,277 | A | 10/2000 | Bruck et al. |
| 6,175,571 | B1 | 1/2001 | Haddock et al. |
| 6,192,472 | B1 | 2/2001 | Garay et al. |
| 6,256,688 | B1 | 7/2001 | Suetaka et al. |
| 6,272,658 | B1 | 8/2001 | Steele et al. |
| 6,301,604 | B1 | 10/2001 | Nojima |
| 6,356,949 | B1 | 3/2002 | Katsandres et al. |
| 6,366,995 | B1 | 4/2002 | Vilkov et al. |
| 6,374,336 | B1 | 4/2002 | Peters et al. |
| 6,415,373 | B1 | 7/2002 | Peters et al. |
| 6,418,539 | B1 | 7/2002 | Walker |
| 6,449,688 | B1 | 9/2002 | Peters et al. |
| 6,567,948 | B2 | 5/2003 | Steele et al. |
| 6,571,282 | B1 | 5/2003 | Bowman-Amuah |
| 6,609,223 | B1 | 8/2003 | Wolfgang |
| 6,718,361 | B1 | 4/2004 | Basani et al. |
| 6,760,808 | B2 | 7/2004 | Peters et al. |
| 6,785,768 | B2 | 8/2004 | Peters et al. |
| 6,785,783 | B2 | 8/2004 | Buckland |
| 6,826,711 | B2 | 11/2004 | Moulton et al. |
| 6,879,596 | B1 | 4/2005 | Dooply |
| 7,003,688 | B1 | 2/2006 | Pittelkow et al. |
| 7,024,451 | B2 | 4/2006 | Jorgenson |
| 7,024,609 | B2 | 4/2006 | Wolfgang et al. |
| 7,080,101 | B1 | 7/2006 | Watson et al. |
| 7,103,824 | B2 | 9/2006 | Halford |
| 7,103,915 | B2 | 9/2006 | Redlich et al. |
| 7,111,115 | B2 | 9/2006 | Peters et al. |
| 7,140,044 | B2 | 11/2006 | Redlich et al. |
| 7,146,644 | B2 | 12/2006 | Redlich et al. |
| 7,171,493 | B2 | 1/2007 | Shu et al. |
| 7,222,133 | B1 | 5/2007 | Raipurkar et al. |
| 7,240,236 | B2 | 7/2007 | Cutts et al. |
| 7,272,613 | B2 | 9/2007 | Sim et al. |
| 7,636,724 | B2 | 12/2009 | de la Torre et al. |
| 2002/0062422 | A1 | 5/2002 | Butterworth et al. |
| 2002/0166079 | A1 | 11/2002 | Ulrich et al. |
| 2003/0018927 | A1 | 1/2003 | Gadir et al. |
| 2003/0037261 | A1 | 2/2003 | Meffert et al. |
| 2003/0065617 | A1 | 4/2003 | Watkins et al. |
| 2003/0084020 | A1 | 5/2003 | Shu |
| 2004/0024963 | A1 | 2/2004 | Talagala et al. |
| 2004/0122917 | A1 | 6/2004 | Menon et al. |
| 2004/0215998 | A1 | 10/2004 | Buxton et al. |
| 2004/0228493 | A1 | 11/2004 | Ma et al. |
| 2005/0100022 | A1 | 5/2005 | Ramprashad |
| 2005/0114594 | A1 | 5/2005 | Corbett et al. |
| 2005/0125593 | A1 | 6/2005 | Karpoff et al. |
| 2005/0131993 | A1 | 6/2005 | Fatula, Jr. |
| 2005/0132070 | A1 | 6/2005 | Redlich et al. |
| 2005/0144382 | A1 | 6/2005 | Schmisseur |
| 2005/0229069 | A1 | 10/2005 | Hassner |
| 2006/0047907 | A1 | 3/2006 | Shiga et al. |
| 2006/0136448 | A1 | 6/2006 | Cialini et al. |
| 2006/0156059 | A1 | 7/2006 | Kitamura |
| 2006/0224603 | A1 | 10/2006 | Correll, Jr. |
| 2007/0079081 | A1 | 4/2007 | Gladwin et al. |
| 2007/0079082 | A1 | 4/2007 | Gladwin et al. |
| 2007/0079083 | A1 | 4/2007 | Gladwin et al. |
| 2007/0088970 | A1 | 4/2007 | Buxton et al. |
| 2007/0174192 | A1 | 7/2007 | Gladwin et al. |
| 2007/0214285 | A1 | 9/2007 | Au et al. |
| 2007/0234110 | A1 | 10/2007 | Soran et al. |
| 2007/0283167 | A1 | 12/2007 | Venters, III et al. |
| 2009/0094251 | A1 | 4/2009 | Gladwin et al. |
| 2009/0094318 | A1 | 4/2009 | Gladwin et al. |
| 2010/0023524 | A1 | 1/2010 | Gladwin et al. |
| 2011/0071988 | A1 | 3/2011 | Resch et al. |
| 2013/0283094 | A1 | 10/2013 | Baptist et al. |
| 2014/0075112 | A1 | 3/2014 | Baptist et al. |
| 2014/0115387 | A1* | 4/2014 | Vas .......... H04L 63/06 714/15 |
| 2014/0122924 | A1* | 5/2014 | Kazi .......... H04L 67/1097 714/6.22 |
| 2014/0207899 | A1* | 7/2014 | Mark .......... H04L 67/1097 709/213 |
| 2014/0331086 | A1 | 11/2014 | Resch |
| 2015/0006594 | A1* | 1/2015 | Volvovski .......... G06F 17/30194 707/827 |
| 2015/0193309 | A1* | 7/2015 | Khadiwala .......... G06F 11/1435 714/4.11 |
| 2015/0220396 | A1* | 8/2015 | Shirley, Jr. .......... G06F 3/06 714/6.23 |
| 2015/0317205 | A1 | 11/2015 | Gray et al. |
| 2015/0319244 | A1* | 11/2015 | Resch .......... G06F 9/526 714/766 |
| 2015/0378822 | A1* | 12/2015 | Grube .......... G06F 11/1092 714/763 |
| 2016/0147453 | A1* | 5/2016 | Baptist .......... G06F 11/2094 711/154 |
| 2016/0255150 | A1* | 9/2016 | Dhuse .......... H04L 67/1097 709/213 |

OTHER PUBLICATIONS

List of IBM Patents of Applications Treated as Related. (previously submitted as Document Description Information Disclosure Statement (IDS) Form SB08 on Aug. 1, 2016).

International Searching Authority; International Search Report and Written Opinion; International Application No. PCT/IB2017/050949; dated Jun. 15, 2017; 13 pgs.

Shamir; How to Share a Secret; Communications of the ACM; vol. 22, No. 11; Nov. 1979; pp. 612-613.

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

(56) References Cited

OTHER PUBLICATIONS

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

List of IBM Patents or Applications Treated as Related, Apr. 23, 2018, 2 pages.

\* cited by examiner

FIG. 1
distributed computing system 10

ENHANCING PERFORMANCE OF DATA STORAGE IN A DISPERSED STORAGE NETWORK

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersed storage of data and distributed task processing of data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

Distributed storage systems are known to utilize a three-phase process for writing consistently in a dispersed storage network (DSN) memory, where the three phases include a write phase, a commit phase, and a finalize phase. The three phases address consistency issues that may arise from different storage units of the DSN holding different revisions of encoded data slices, where data is dispersed storage error encoded to produce the encoded data slices. The three phases are known to utilize a threshold approach to advance the writing process to the next phase or to reverse the process when conflicts and errors arise to maintain consistency of revision storage.

DETAILED DESCRIPTION OF THE INVENTION

Figure 1:
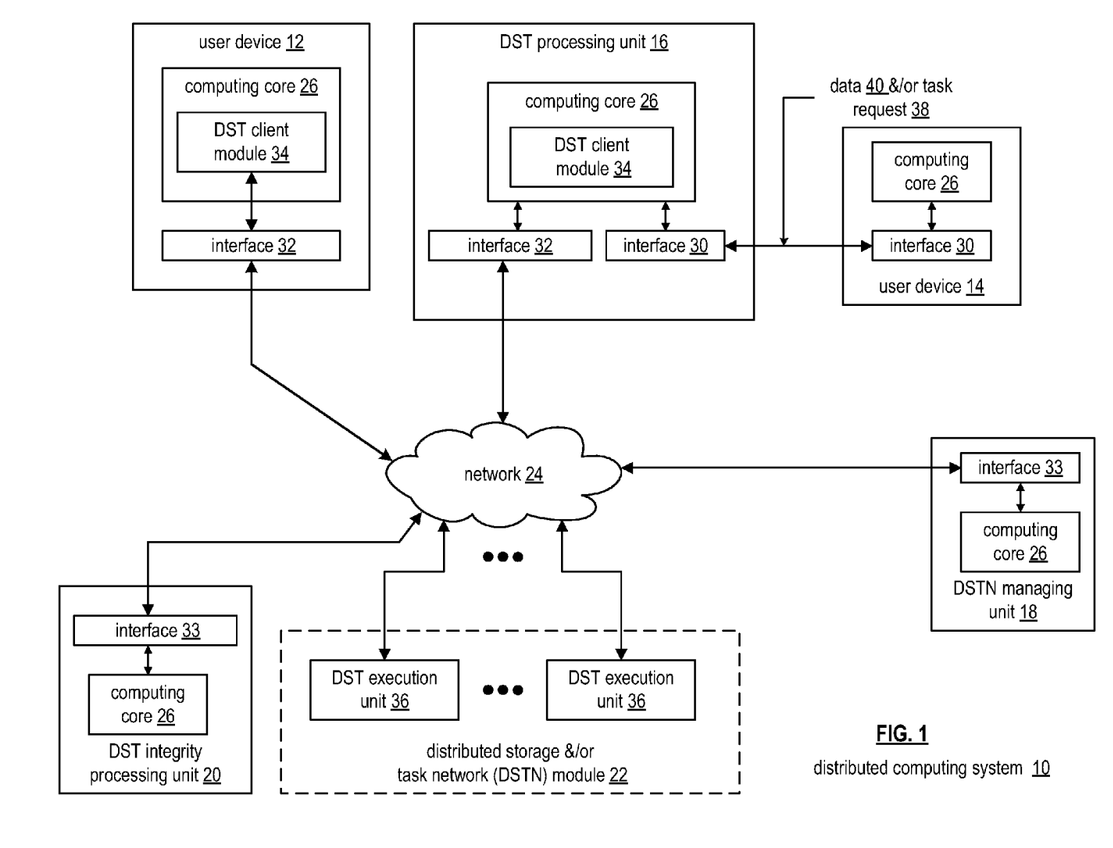
FIG. 1 is a schematic block diagram of an embodiment of a distributed computing system in accordance with the present invention.

FIG. 1 is a schematic block diagram of an embodiment of a distributed computing system 10 that includes a user device 12 and/or a user device 14, a distributed storage and/or task (DST) processing unit 16, a distributed storage and/or task network (DSTN) managing unit 18, a DST integrity processing unit 20, and a distributed storage and/or task network (DSTN) module 22. The components of the distributed computing system 10 are coupled via a network 24, which may include one or more wireless and/or wire lined communication systems; one or more non-public intranet systems and/or public internet systems; and/or one or more local area networks (LAN) and/or wide area networks (WAN). Hereafter, the distributed computing system 10 may be interchangeably referred to as a dispersed storage network (DSN).

The DSTN module 22 includes a plurality of distributed storage and/or task (DST) execution units 36 that may be located at geographically different sites (e.g., one in Chicago, one in Milwaukee, etc.). Each of the DST execution units is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. Hereafter, the DST execution unit may be interchangeably referred to as a storage unit and a set of DST execution units may be interchangeably referred to as a set of storage units.

Each of the user devices 12-14, the DST processing unit 16, the DSTN managing unit 18, and the DST integrity processing unit 20 include a computing core 26 and may be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. User device 12 and DST processing unit 16 are configured to include a DST client module 34.

With respect to interfaces, each interface 30, 32, and 33 includes software and/or hardware to support one or more communication links via the network 24 indirectly and/or directly. For example, interface 30 supports a communication link (e.g., wired, wireless, direct, via a LAN, via the network 24, etc.) between user device 14 and the DST processing unit 16. As another example, interface 32 supports communication links (e.g., a wired connection, a wireless connection, a LAN connection, and/or any other type of connection to/from the network 24) between user device 12 and the DSTN module 22 and between the DST processing unit 16 and the DSTN module 22. As yet another example, interface 33 supports a communication link for each of the DSTN managing unit 18 and DST integrity processing unit 20 to the network 24.

The distributed computing system 10 is operable to support dispersed storage (DS) error encoded data storage and retrieval, to support distributed task processing on received data, and/or to support distributed task processing on stored data. In general, and with respect to DS error encoded data storage and retrieval, the distributed computing system 10 supports three primary operations: storage management, data storage and retrieval, and data storage integrity verification. In accordance with these three primary functions, data can be encoded (e.g., utilizing an information dispersal algorithm (IDA), utilizing a dispersed storage error encoding process), distributedly stored in physically different locations, and subsequently retrieved in a reliable and secure manner. Hereafter, distributedly stored may be interchangeably referred to as dispersed stored. Such a system is tolerant of a significant number of failures (e.g., up to a failure level, which may be greater than or equal to a pillar width (e.g., an IDA width of the IDA) minus a decode threshold minus one) that may result from individual storage device (e.g., DST execution unit 36) failures and/or network equipment failures without loss of data and without the need for a redundant or backup copy. Further, the distributed computing system 10 allows the data to be stored for an indefinite period of time without data loss and does so in a secure manner (e.g., the system is very resistant to unauthorized attempts at accessing the data).

The second primary function (i.e., distributed data storage and retrieval) begins and ends with a user device 12-14. For instance, if a second type of user device 14 has data 40 to store in the DSTN module 22, it sends the data 40 to the DST processing unit 16 via its interface 30. The interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data 40.

To support storage management, the DSTN managing unit 18 performs DS management services. One such DS management service includes the DSTN managing unit 18 establishing distributed data storage parameters (e.g., vault creation, distributed storage parameters, security parameters, billing information, user profile information, etc.) for a user device 12-14 individually or as part of a group of user devices. For example, the DSTN managing unit 18 coordinates creation of a vault (e.g., a virtual memory block associated with a portion of an overall namespace of the DSN) within memory of the DSTN module 22 for a user device, a group of devices, or for public access and establishes per vault dispersed storage (DS) error encoding parameters for a vault. The DSTN managing unit 18 may facilitate storage of DS error encoding parameters for each vault of a plurality of vaults by updating registry information for the distributed computing system 10. The facilitating includes storing updated system registry information in one or more of the DSTN module 22, the user device 12, the DST processing unit 16, and the DST integrity processing unit 20.

The DS error encoding parameters (e.g., or dispersed storage error coding parameters for encoding and decoding) include data segmenting information (e.g., how many segments data (e.g., a file, a group of files, a data block, etc.) is divided into), segment security information (e.g., per segment encryption, compression, integrity checksum, etc.), error coding information (e.g., pillar/IDA width, decode threshold, read threshold, write threshold, etc.), slicing information (e.g., the number of encoded data slices that will be created for each data segment); and slice security information (e.g., per encoded data slice encryption, compression, integrity checksum, etc.).

The DSTN managing unit 18 creates and stores user profile information (e.g., an access control list (ACL)) in local memory and/or within memory of the DSTN module 22. The user profile information includes authentication information, permissions, and/or the security parameters. The security parameters may include encryption/decryption scheme, one or more encryption keys, key generation scheme, and/or data encoding/decoding scheme.

The DSTN managing unit 18 creates billing information for a particular user, a user group, a vault access, public vault access, etc. For instance, the DSTN managing unit 18 tracks the number of times a user accesses a non-public vault and/or public vaults, which can be used to generate a per-access billing information. In another instance, the DSTN managing unit 18 tracks the amount of data stored and/or retrieved by a user device and/or a user group, which can be used to generate a per-data-amount billing information.

Another DS management service includes the DSTN managing unit 18 performing network operations, network administration, and/or network maintenance. Network operations includes authenticating user data allocation requests (e.g., read and/or write requests), managing creation of vaults, establishing authentication credentials for user devices, adding/deleting components (e.g., user devices, DST execution units, and/or DST processing units) from the distributed computing system 10, and/or establishing authentication credentials for DST execution units 36. Network administration includes monitoring devices and/or units for failures, maintaining vault information, determining device and/or unit activation status, determining device and/or unit loading, and/or determining any other system level operation that affects the performance level of the system 10. Network maintenance includes facilitating replacing, upgrading, repairing, and/or expanding a device and/or unit of the system 10.

To support data storage integrity verification within the distributed computing system 10, the DST integrity processing unit 20 performs rebuilding of 'bad' or missing encoded data slices. At a high level, the DST integrity processing unit 20 performs rebuilding by periodically attempting to retrieve/list encoded data slices, and/or slice names of the encoded data slices, from the DSTN module 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in memory of the DSTN module 22. Note that the DST integrity processing unit 20 may be a separate unit as shown, it may be included in the DSTN module 22, it may be included in the DST processing unit 16, and/or distributed among the DST execution units 36.

Each slice name is unique to a corresponding encoded data slice and includes multiple fields associated with the overall namespace of the DSN. For example, the fields may include a pillar number/pillar index, a vault identifier, an object number uniquely associated with a particular file for storage, and a data segment identifier of a plurality of data segments, where the particular file is divided into the plurality of data segments. For example, each slice name of a set of slice names corresponding to a set of encoded data slices that has been dispersed storage error encoded from a common data segment varies only by entries of the pillar number field as each share a common vault identifier, a common object number, and a common data segment identifier.

To support distributed task processing on received data, the distributed computing system 10 has two primary operations: DST (distributed storage and/or task processing) management and DST execution on received data. With respect to the storage portion of the DST management, the DSTN managing unit 18 functions as previously described. With respect to the tasking processing of the DST management, the DSTN managing unit 18 performs distributed task processing (DTP) management services. One such DTP management service includes the DSTN managing unit 18 establishing DTP parameters (e.g., user-vault affiliation information, billing information, user-task information, etc.) for a user device 12-14 individually or as part of a group of user devices.

Another DTP management service includes the DSTN managing unit 18 performing DTP network operations, network administration (which is essentially the same as described above), and/or network maintenance (which is essentially the same as described above). Network operations include, but are not limited to, authenticating user task processing requests (e.g., valid request, valid user, etc.), authenticating results and/or partial results, establishing DTP authentication credentials for user devices, adding/deleting components (e.g., user devices, DST execution units, and/or DST processing units) from the distributed computing system, and/or establishing DTP authentication credentials for DST execution units.

To support distributed task processing on stored data, the distributed computing system 10 has two primary operations: DST (distributed storage and/or task) management and DST execution on stored data. With respect to the DST execution on stored data, if the second type of user device 14 has a task request 38 for execution by the DSTN module 22, it sends the task request 38 to the DST processing unit 16 via its interface 30. With respect to the DST management, it is substantially similar to the DST management to support distributed task processing on received data.

Figure 2:
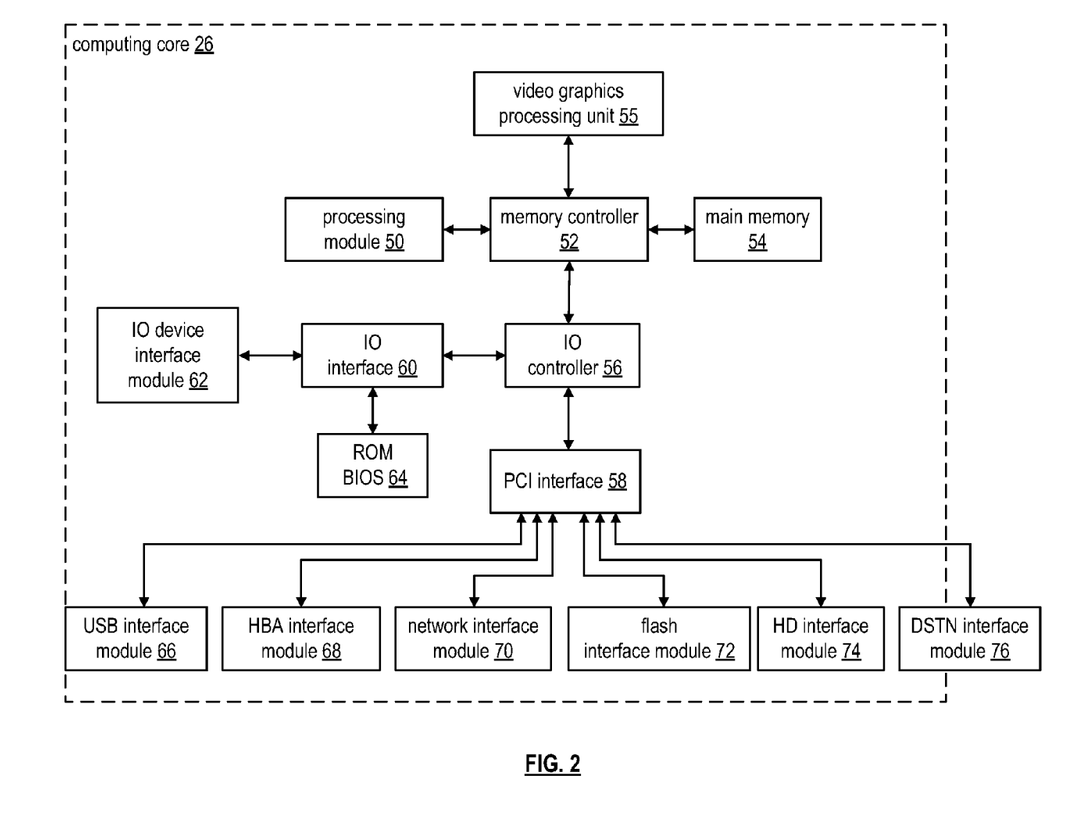
FIG. 2 is a schematic block diagram of an embodiment of a computing core in accordance with the present invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSTN interface module 76.

The DSTN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSTN interface module 76 and/or the network interface module 70 may function as the interface 30 of the user device 14 of FIG. 1. Further note that the IO device interface module 62 and/or the memory interface modules may be collectively or individually referred to as IO ports.

Figure 3:
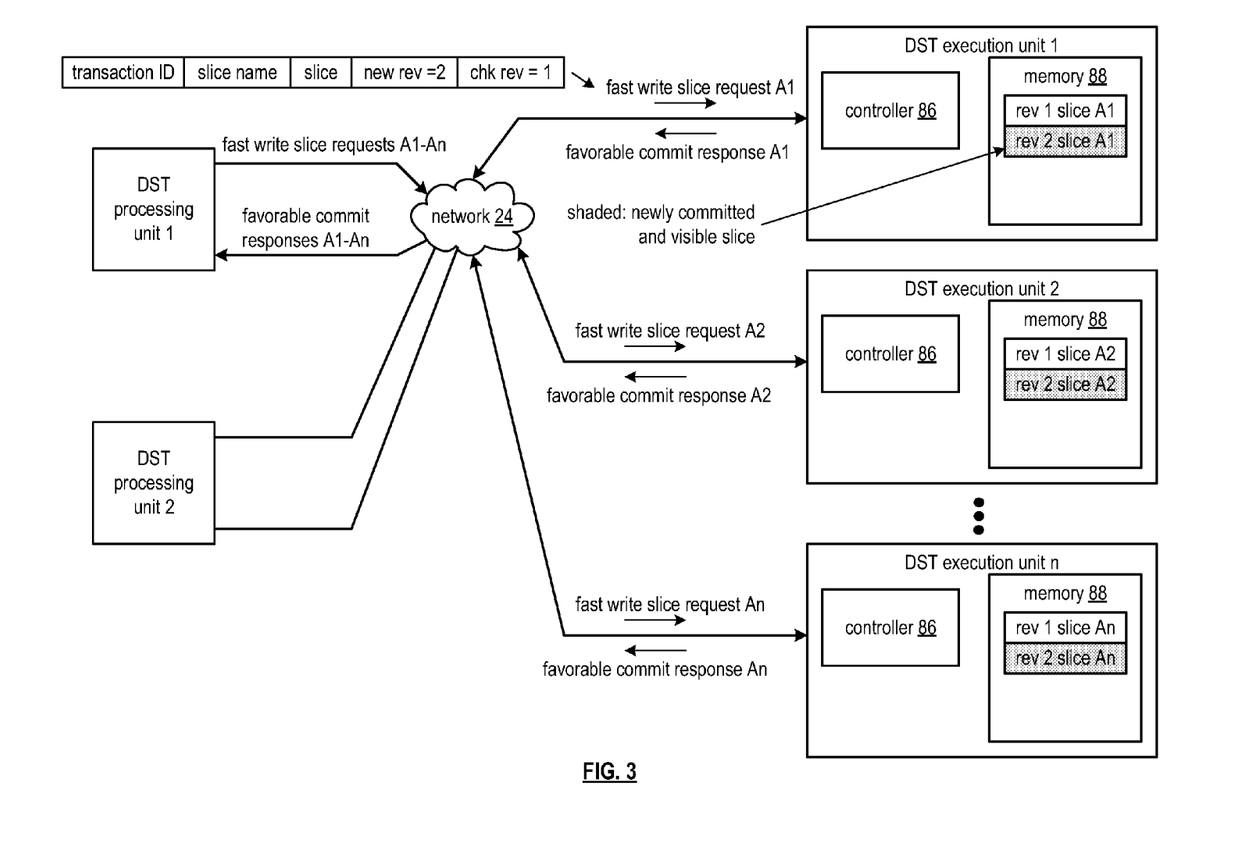
FIGS. 3-5 are schematic block diagrams of an embodiment of a dispersed storage network (DSN) in accordance with the present invention.
Figure 4:
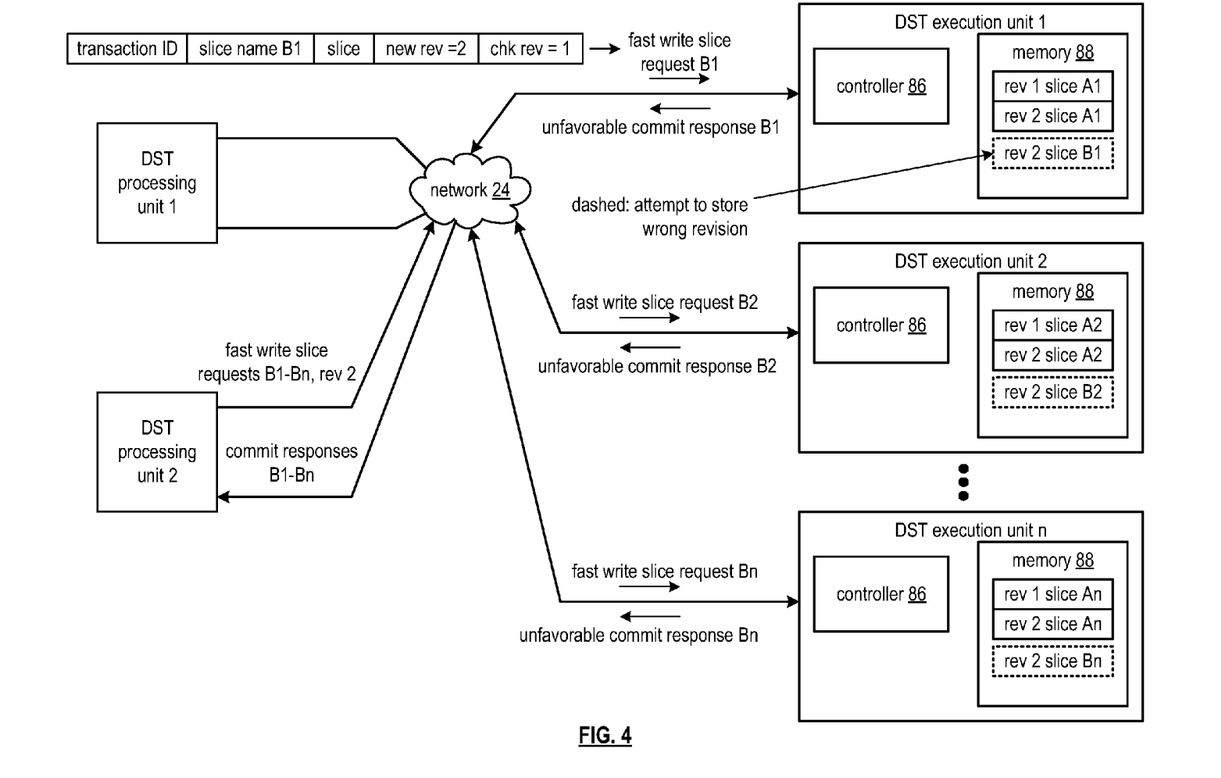
Figure 5:
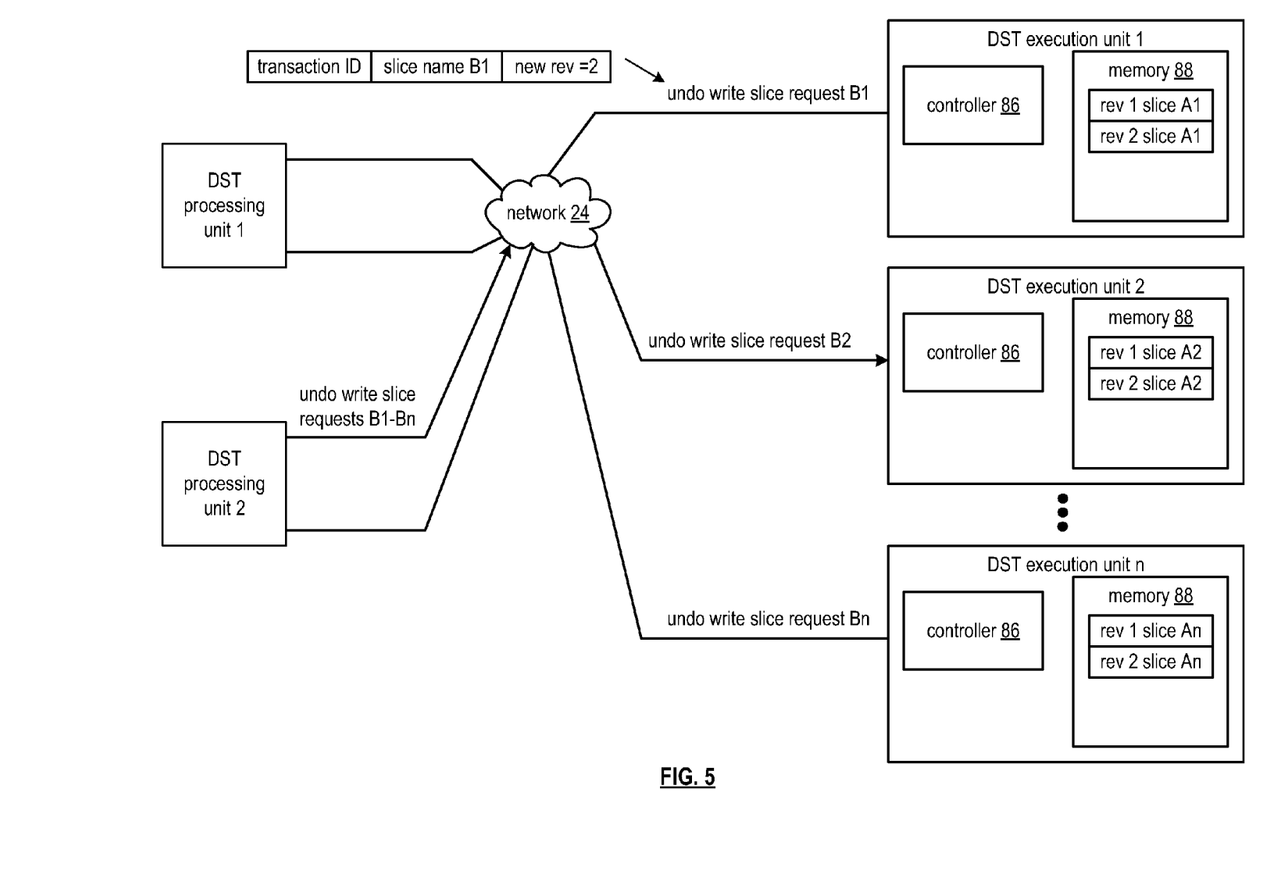

FIGS. 3-5 are schematic block diagrams of an embodiment of a dispersed storage network (DSN) that includes distributed storage and task (DST) processing units 1 and 2, the network 24 of FIG. 1, and a set of DST execution units 1-n. Hereafter, each DST processing unit may be interchangeably referred to as a computing device of one or more computing devices of the DSN, where each computing device includes an interface, a memory, and a processing module. The interface may be implemented utilizing the interface 32 of FIG. 1. The memory may be implemented utilizing the main memory 54 of FIG. 2 and/or any other memory devices including a solid-state memory and a magnetic disk drive memory. The processing module may be implemented utilizing the processing module 50 of FIG. 2. Each DST processing unit may be implemented utilizing the DST processing unit 16 of FIG. 1.

Each DST execution unit may be implemented utilizing the DST execution unit 36 of FIG. 1 and includes a controller 86 and a memory 88. The controller 86 may be implemented utilizing one or more of the computing core 26 of FIG. 2 and processing module 50 of FIG. 2. The memory 88 may be implemented utilizing one or more of solid-state memory, magnetic disk drive memory, optical disk drive memory, etc. Hereafter, each DST execution unit may be interchangeably referred to as a storage unit and the set of DST execution units may be interchangeably referred to as a set of storage units.

The DSN functions to store data in accordance with a selected storage approach, where data files associated with a plurality of revisions of a data object are dispersed storage error encoded to produce a one or more sets of encoded data slices for each of the plurality of revisions, and where requests to store the one or more sets of encoded data slices are processed in accordance with the selected storage approach. Such a selected storage approach may provide a system performance improvement when selecting a particular storage approach associated with more efficient DSN resource utilization. The selected storage approach is selected from a plurality of storage approaches, where the plurality of storage approaches includes a fast write approach and a write approach. The fast write approach can provide the system performance improvement over the write approach when an assumption to drive selection of the fast write approach is valid.

FIG. 3 illustrates an example of operation of the selecting and utilization of the storage approach where, the DST processing unit 1, for a set of encoded data slices to be stored in storage units of the DSN, determines a level of confidence regarding a revision level for the set of encoded data slices. The confidence threshold includes at least one of a level of certainty regarding a current revision value (e.g., last stored) and a new revision value (e.g., of the set of encoded data slices), and a level of certainty regarding writing priority for the set of encoded data slices. The level of certainty regarding writing priority includes one or more of information indicating that the DST processing unit 1 (e.g., computing device) has a high probability to be the only device writing the set of encoded data slices, and information indicating that the DST processing unit 1 has a highest priority with respect to writing the set of encoded data slices. For example, the DST processing unit 1 indicates a high level of certainty when a perception of potential conflicts with other DST processing units is lower than average. As another example, the DST processing unit 1 indicates the high level of certainty when an estimate of a number of encoded data slices of the set of encoded data slices that is expected to be successfully stored is greater than a write threshold number. As yet another example, the DST processing unit 1 indicates the high level of certainty when interpreting a plurality of list slice responses indicating that the current revision value is one revision less than the new revision value.

When the level of confidence is equal to or above a confidence threshold, the DST processing unit 1 sends, via the network 24, a set of write and commit requests (e.g., fast write slice requests A1-An) to the storage units of the DSN. A write and commit request of the set of write and commit requests includes one or more of a transaction identifier (ID), an encoded data slice of the set of encoded data slices, a slice name of the encoded data slice, the current revision value (e.g., a check revision that should match a currently stored revision, i.e., rev 1), and the new revision value (i.e., rev 2).

The DST execution units receive a request to store an encoded data slice of the set of encoded data slices (e.g., the write and commit request or a write request). A storage unit determines whether the request is the write and commit request or the write request. The determining whether the request is the write and commit request or the write request includes determining that the request is the write and commit request when the request includes both the current revision value and the new revision value. The determining further includes determining that the request is the write request when the request includes a revision value (e.g., a new revision value to be written and not the current revision value). For example, the DST execution unit 1 indicates that the request to store the encoded data slice is the write and commit request A1 when extracting both the new revision level and the current revision level from the request.

When the request is the write and commit request, the storage unit compares the current revision value of the write and commit request with a local current revision value associated with the encoded data slice. For example, the DST execution unit 1 compares the current revision value of the request A1 (e.g., rev 1) to a local current revision value of 1 associated with a revision 1 encoded data slice A1 stored in the memory 88 of the DST execution unit 1. When the current revision value of the write and commit request is substantially equal to the local current revision value, the storage unit stores the encoded data slice in accordance with the new revision value of the write and commit request. For example, the controller 86 of the DST execution unit 1 stores the received encoded data slice revision 2 slice A1 of the write and commit request A1 in the memory 88 of the DST execution unit 1 when determining that the revision 1 of the current revision value of the request is substantially equal to the local current revision value of 1.

Having stored the encoded data slice, the storage unit makes the encoded data slice available for accessing. For example, the controller 86 of the DST execution unit 1 indicates that the revision 2 of the encoded data slice A1 is available for access (e.g., retrieval, overwriting). Having made the encoded data slice available for accessing, the storage unit sends a favorable write and commit response to the DST processing unit 1. For example, the controller 86 of the DST execution unit 1 and generates a favorable commit response A1 indicating that the revision 2 of the encoded data slice A1 has been successfully stored by the DST execution 1, and sends, via the network 24, the favorable commit response A1 to the DST processing unit 1. Alternatively, when the current revision value of the write and commit request is not substantially equal to the local current revision value, the storage unit sends an unfavorable write and commit message to the DST processing unit 1 indicating a revision mismatch.

When a threshold number of favorable write and commit responses have been received from the storage units in a predetermined time period (e.g., a writing phase timeframe), the DST processing unit 1 issues a set of finalize write requests. For example, the DST processing unit 1 determines that a write threshold number of favorable write and commit responses have been received and issues, via the network 24, the set of finalize write requests to the set of storage units. Each finalize write requests includes one or more of the new revision number, the transaction identifier, and a corresponding slice name. In response to the favorable write and commit response, the storage unit may receive a corresponding finalize command and in response to the finalize command, the storage unit deletes an encoded data slice associated with the local current revision (e.g., overwritten with the encoded data slice of the write and commit request).

Alternatively, when the threshold number of favorable write and commit responses have not been received from the storage units in the predetermined time period, the DST processing unit 1 issues a set of undo commands to the storage units. Each undo command includes one or more of the new revision number, the transaction identifier, and the corresponding slice name. In response to the favorable write and commit response or the unfavorable rating commit response, when the storage unit receives an undo command, the storage unit deletes the encoded data slice (e.g., the encoded data slice of the write and commit request).

When the level of confidence is below the confidence threshold, the computing device (e.g., a DST processing unit) sends a set of write requests to the storage units of the DSN, where a write request of the set of write requests includes the encoded data slice of the set of encoded data slices and the new revision value. Alternatively, prior to sending the set of write requests, the computing device may send a set of check list requests regarding the set of encoded data slices to the storage units, where a check list request of the set check list requests includes a request for a current revision value for one of the set of encoded data slices stored by one of the storage units. Having sent the set of checklist requests, the computing device determines the new revision value based on check list responses from at least some of the storage units. For the example, the computing device generates a new revision value of 2 when the checklist responses indicate that the current revision value is 1.

When the request is the write request, the storage unit determines whether a revision value of the write request corresponds to a local revision value (e.g., currently stored)

associated with the encoded data slice. For example, the storage unit indicates that the revision value of the write request corresponds to the local revision value when the revision value of the write request is greater than the local revision value. When the revision value of the write request corresponds to the local revision value, the storage unit stores the encoded data slice, makes the encoded data slice unavailable for accessing (e.g., not retrievable, not over-write-able; since waiting for a write commit request), and sends, via the network 24, a favorable write response to the computing device.

When the threshold number of favorable write responses have not been received from the storage units in the predetermined time period, the computing device issues a set of write rollback commands (e.g., including one or more of a transaction identifier of the write request, a slice name, and the revision value of the write request) to the storage units to facilitate deletion of the corresponding received encoded data slice. Alternatively, when receiving a threshold number (e.g., the read threshold number) of favorable write responses have been received from the storage units in the predetermined time period, the computing device issues a set of write commit requests to the storage units. In response to the favorable write response, the storage unit receives a commit command (e.g., a write commit request) regarding the encoded data slice. In response to the commit command, the storage unit makes the encoded data slice available for accessing and sends a favorable commit response.

When a threshold number of favorable write commit responses have been received from the storage units in the predetermined time period, the computing device issues the set of finalize write requests. Alternatively, when the threshold number of favorable write commit responses have not been received from the storage units in the predetermined time period, the computing device issues a set of undo commands.

FIG. 4 illustrates another example of operation of the selecting and utilization of the storage approach where, for a set of encoded data slices to be stored in storage units of the DSN, the DST processing unit 2 determines a level of confidence regarding a revision level for the set of encoded data slices. For example, the DST processing unit 2 incorrectly determines with a high level of certainty that a current revision level of stored encoded data slices corresponding to the set of encoded data slices is revision 1 when in fact the revision level is 2, and indicates that the level of confidence to the greater than a confidence threshold. For instance, the DST processing unit 2 relies on previous revision information stored locally within the DST processing unit 2 that the current revision level is revision 1 prior to the DST processing unit 1 starring the revision level 2 in a set of storage units as described with reference to FIG. 3.

When the level of confidence is equal to or above the confidence threshold, the DST processing unit 2 sends a set of write and commit requests to the storage units of the DSN, where a write and commit request of the set of write and commit requests includes an encoded data slice of the set of encoded data slices, a current revision value, and a new revision value. For example, the DST processing unit 2 generates a set of fast write requests B1-Bn for a revision level 2, where each fast write request includes one or more of a transaction identifier (ID), the encoded data slice, a slice name of the encoded data slice, the current revision value of 1, and a new revision value of 2, and sends, via the network 24, the set of fast write requests B1-Bn to the set of storage units.

At least some of the storage units receive a request to store the encoded data slice of the set of encoded data slices. Each storage unit receiving a request determines that the request is the write and commit request when the request includes both the current revision value and the new revision value. When the request is the write and commit request, the storage unit compares a current revision value of the write and commit request with a local current revision value associated with the encoded data slice (e.g., of the slice name of the request). For example, the controller 86 of the DST execution unit 1 compares the current revision value of 1 of the write and commit requests with the local current revision value of 2 (e.g., for revision 2 of encoded data slice A1 previously stored as a most recent revision). When the current revision value of the write and commit request is not substantially equal to the local current revision value, the storage unit sends an unfavorable write and commit message. For example, the controller 86 of the DST execution unit 1 indicates that the current revision value of the write and commit request is not substantially equal to the local current revision value, generates the unfavorable write and commit message to include one or more of an indicator of a current revision mismatch, the transaction ID, the slice name B1, a local current revision value, the current revision value of the request, and the new revision value of the request.

FIG. 5 further illustrates the other example of operation of the selecting and utilization of the storage approach where, the DST processing unit 2, when receiving the unfavorable write and commit messages, and when determining that a threshold number (e.g., a write threshold number) of favorable write and commit responses have not been received from the storage units in a predetermined time period, issues a set of undo commands to the storage units. For example, the DST processing and 2, it determines that the write threshold number of favorable write and commit messages have not been received, generates a set of undo commands (e.g., undo write slice requests B1-Bn), and sends, via the network 24, the set of undo commands to the DST execution units. Each storage unit, receiving a corresponding undo command, deletes the encoded data slice. For the example, the controller 86 of the DST execution unit 1 deletes the revision 2 encoded data slice B1, the controller 86 of the DST execution unit 2 deletes the revision 2 encoded data slice B2, etc.

Alternatively, or in addition to, the DST processing unit 2, re-initiates storage of the set of encoded data slices. The reinitiating includes generating another write and commit request to include the encoded data slice of the set of encoded data slices, a corrected current revision value (e.g., revision 2), and a corrected new revision value (e.g., revision 3). For example, the DST processing unit 2 generates another set of fast write requests B1-Bn for the revision level 3, where each fast write request includes one or more of a new transaction identifier (ID), the encoded data slice, the slice name of the encoded data slice, the corrected current revision value of 2, and the corrected new revision value of 3, and sends, via the network 24, the other set of fast write requests B1-Bn to the set of storage units.

Figure 6:
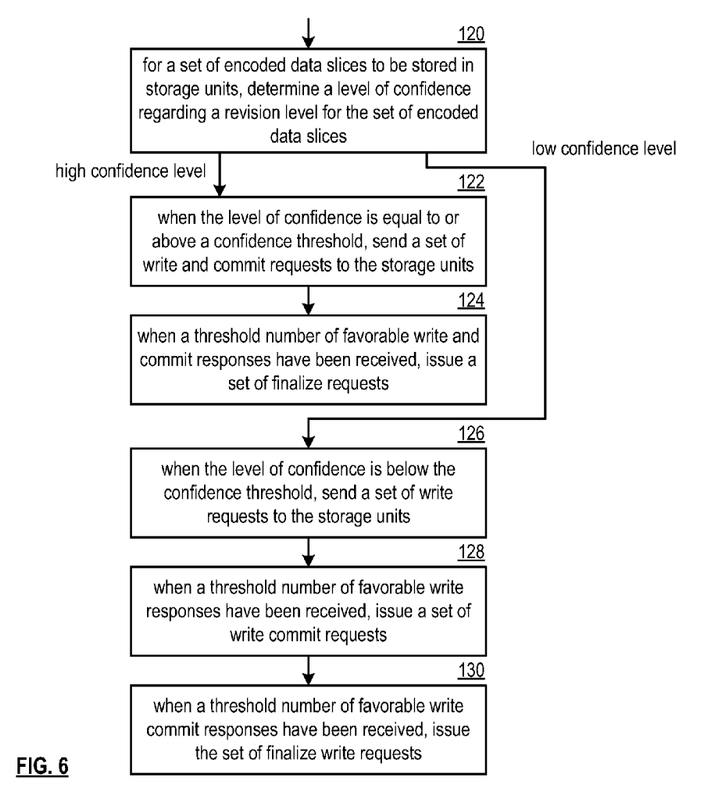
FIG. 6 is a flowchart illustrating an example of selecting a storage approach in accordance with the present invention.

FIG. 6 is a flowchart illustrating an example of selecting a storage approach. In particular, a method is presented for use in conjunction with one or more functions and features described in conjunction with FIGS. 1-2, 3-5, and also FIG. 6. The method includes step 120 where a processing module of a computing device (e.g., a distributed storage and task (DST) processing unit) of one or more computing devices of a dispersed storage network (DSN), for a set of encoded data slices to be stored in storage units of a distributed storage and task network (DSN), determines a level of confidence regarding a revision level for the set of encoded data slices. When the level of confidence is below the confidence threshold, the method branches to step 126. When the level of confidence is equal to or above a confidence threshold, the method continues to step 122.

The method continues at step 122 where the processing module sends a set of write and commit requests to the storage units of the DSN, where a write and commit request of the set of write and commit requests includes an encoded data slice of the set of encoded data slices, a current revision value, and a new revision value. When a threshold number (e.g., a write threshold number) of favorable write and commit responses have been received from the storage units in a predetermined time period, the method continues at step 124 where the processing module issues a set of finalize write requests. Alternatively, when the threshold number of favorable write and commit responses have not been received from the storage units in the predetermined time period, the processing module issues a set of undo commands to the storage units.

When the level of confidence is below the confidence threshold, the method continues at step 126 where the processing module sends a set of write requests to the storage units of the DSN, where a write request of the set of write requests includes the encoded data slice of the set of encoded data slices and the new revision value. Prior to sending the set of write requests, the processing module may send a set of check list requests regarding the set of encoded data slices to the storage units, where a check list request of the set check list requests includes a request for a current revision value for one of the set of encoded data slices stored by one of the storage units. Having sent the set of checklist requests, the processing module determines the new revision value based on check list responses from at least some of the storage units (e.g., incrementing a consensus current revision value by one to produce the new revision value).

When a threshold number (e.g., a write threshold number) of favorable write responses have been received from the storage units in the predetermined time period, the method continues at step 128 where the processing module sends a set of write commit requests to the storage units. Alternatively, when the threshold number of favorable write responses have not been received from the storage units in the predetermined time period, the processing module issues a set of write rollback commands to facilitate deletion of the set of encoded data slices by the storage units.

When a threshold number of favorable write commit responses have been received from the storage units in the predetermined time period, the method continues at step 130 where the processing module issues the set of finalize write requests to the storage units. Alternatively, when the threshold number of favorable write commit responses have not been received from the storage units in the predetermined time period, the processing module issues a set of undo commands to facilitate deletion of the set of encoded data slices by the storage units.

The method described above in conjunction with the processing module can alternatively be performed by other modules of the dispersed storage network or by other devices. In addition, at least one memory section (e.g., a non-transitory computer readable storage medium such as a computer readable memory device) that stores operational instructions can, when executed by one or more processing modules of one or more computing devices of the dispersed storage network (DSN), cause the one or more computing devices to perform any or all of the method steps described above.

Figure 7:
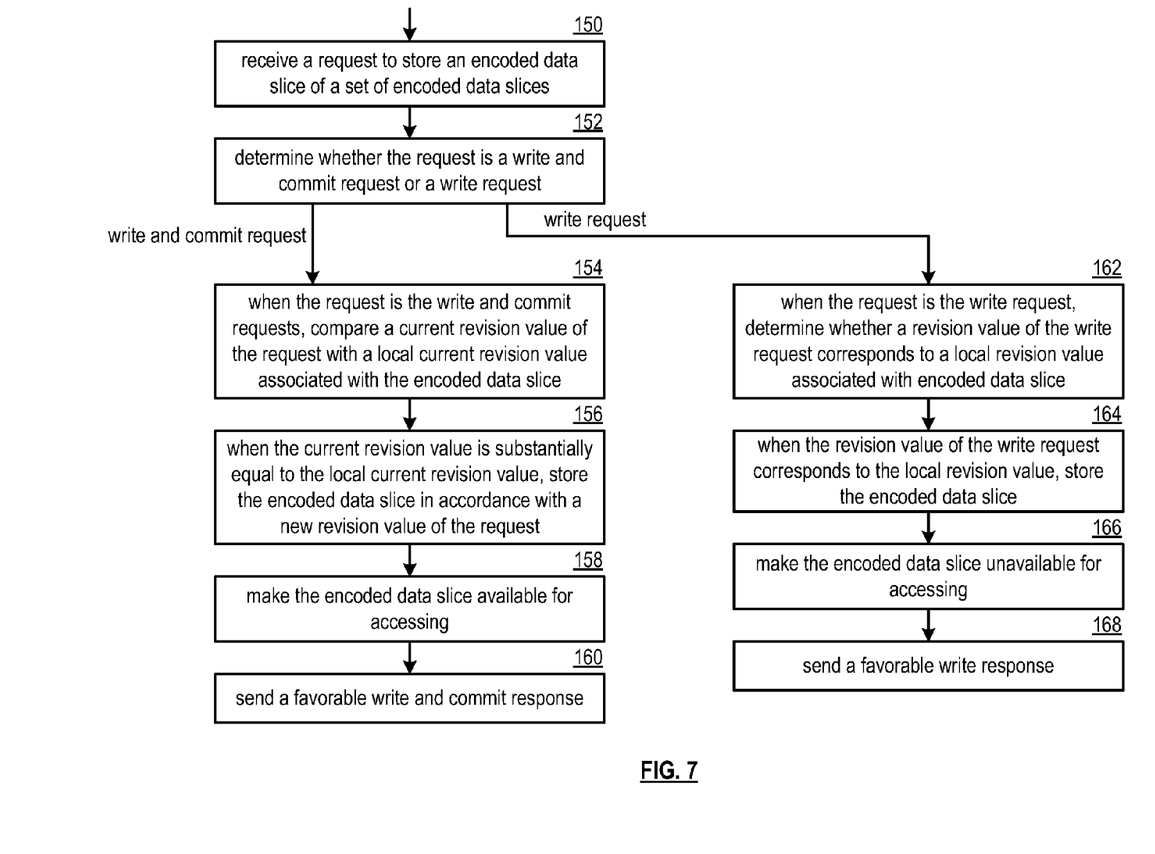
FIG. 7 is a flowchart illustrating an example of storing encoded data slices in accordance with a selected storage approach in accordance with the present invention.

FIG. 7 is a flowchart illustrating an example of storing encoded data slices in accordance with a selected storage approach. In particular, a method is presented for use in conjunction with one or more functions and features described in conjunction with FIGS. 1-2, 3-5, and also FIG. 7. The method includes step 150 where a processing module of a storage unit of one or more storage units of a dispersed storage network (DSN) receives a request to store an encoded data slice of a set of encoded data slices (e.g., from a requesting entity). The method continues at step 152 where the processing module determines whether the request is a write and commit request or a write request. The determining includes determining that the request is the write and commit request when the request includes both the current revision value and the new revision value, and determining that the request is the write request when the request includes the revision value. The method branches to step 162 when the request is the write request. The method continues to step 154 when the request is the write and commit request.

When the request is the write and commit request, the method continues at step 154 where the processing module compares a current revision value of the write and commit request with a local current revision value associated with the encoded data slice. When the current revision value of the write and commit request is substantially equal to the local current revision value, the method continues at step 156 where the processing module stores the encoded data slice in accordance with a new revision value of the write and commit request. The method continues at step 158 where the processing module makes the encoded data slice available for accessing. The method continues at step 160 where the processing module sends a favorable write and commit response (e.g., to the requesting entity). Alternatively, when the current revision value of the write and commit request is not substantially equal to the local current revision value, the processing module sends an unfavorable write and commit message (e.g., to the requesting entity).

Further alternatively, or in addition to, the processing module may, in response to the favorable write and commit response, receive an undo command (e.g., from the requesting entity). In response to the undo command, the processing module deletes the encoded data slice. Alternatively, in response to the favorable write and commit response, the processing module may receive a finalize command and in response to the finalize command, the processing module deletes an encoded data slice associated with the local current revision (e.g., overwritten with the encoded data slice of the write and commit request).

When the request is the write request, the method continues at step 162 where the processing module determines whether a revision value of the write request corresponds to a local revision value associated with the encoded data slice. When the revision value of the write request corresponds to the local revision value, the method continues at step 164 where the processing module stores the encoded data slice. The method continues at step 166 where the processing module makes the encoded data slice unavailable for accessing (e.g., indicates that the encoded data slice cannot be overwritten and cannot be read). The method continues at step 168 where the processing module sends a favorable write response (e.g., to the requesting entity).

Alternatively, or in addition to, the processing module, in response to the favorable write response, receives a commit command regarding the encoded data slice (e.g., from the requesting entity). In response to the commit command, the processing module makes the encoded data slice available for accessing and sends a favorable commit response (e.g., to the requesting entity).

The method described above in conjunction with the processing module can alternatively be performed by other modules of the dispersed storage network or by other devices. In addition, at least one memory section (e.g., a non-transitory computer readable storage medium such as a computer readable memory device) that stores operational instructions can, when executed by one or more processing modules of one or more computing devices of the dispersed storage network (DSN), cause the one or more computing devices to perform any or all of the method steps described above.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method for execution by a computing device of a dispersed storage network (DSN), the method comprises:
for a set of encoded data slices to be stored in storage units of the DSN, determining a level of confidence regarding a revision level for the set of encoded data slices;
when the level of confidence is equal to or above a confidence threshold:
sending a set of write and commit requests to the storage units of the DSN, wherein a write and commit request of the set of write and commit requests includes an encoded data slice of the set of encoded data slices, a current revision value, and a new revision value; and
when a threshold number of favorable write and commit responses have been received from the storage units in a predetermined time period, issuing a set of finalize write requests; and
when the level of confidence is below the confidence threshold:
sending a set of write requests to the storage units of the DSN, wherein a write request of the set of write requests includes the encoded data slice of the set of encoded data slices and the new revision value;
when a threshold number of favorable write responses have been received from the storage units in the predetermined time period, issuing a set of write commit requests; and
when a threshold number of favorable write commit responses have been received from the storage units in the predetermined time period, issuing the set of finalize write requests.

2. The method of claim 1 further comprises:
prior to sending the set of write requests:
sending a set of check list requests regarding the set of encoded data slices to the storage units, wherein a check list request of the set of check list requests includes a request for a current revision value for one of the set of encoded data slices stored by one of the storage units; and
determining the new revision value based on check list responses from at least some of the storage units.

3. The method of claim 1, wherein the confidence threshold comprises:
a level of certainty regarding the current revision value and the new revision value; and
a level of certainty regarding writing priority for the set of encoded data slices.

4. The method of claim 3, wherein the level of certainty regarding writing priority comprises one or more of:
information indicating that the computing device has a high probability to be an only device writing the set of encoded data slices; and
information indicating that the computing device has a highest priority with respect to writing the set of encoded data slices.

5. The method of claim 1 further comprises:
when the threshold number of favorable write and commit responses have not been received from the storage units in the predetermined time period, issuing a set of undo commands to the storage units.

6. The method of claim 1 further comprises:
when the threshold number of favorable write responses have not been received from the storage units in the predetermined time period, issuing a set of write rollback commands; and
when the threshold number of favorable write commit responses have not been received from the storage units in the predetermined time period, issuing a set of undo commands.

7. A method for execution by a storage unit of a dispersed storage network (DSN), the method comprises:
receiving a request to store an encoded data slice of a set of encoded data slices;
determining whether the request is a write and commit request or a write request;
when the request is the write and commit request:
comparing a current revision value of the write and commit request with a local current revision value associated with the encoded data slice; and
when the current revision value of the write and commit request is substantially equal to the local current revision value:
storing the encoded data slice in accordance with a new revision value of the write and commit request;
making the encoded data slice available for accessing; and
sending a favorable write and commit response; and
when the request is the write request:
determining whether a revision value of the write request corresponds to a local revision value associated with the encoded data slice;
when the revision value of the write request corresponds to the local revision value:
storing the encoded data slice;
making the encoded data slice unavailable for accessing; and
sending a favorable write response.

8. The method of claim 7, wherein the determining whether the request is the write and commit request or the write request comprises:

determining that the request is the write and commit request when the request includes both the current revision value and the new revision value; and determining that the request is the write request when the request includes the revision value.

9. The method of claim 7 further comprises:

when the current revision value of the write and commit request is not substantially equal to the local current revision value, sending an unfavorable write and commit message.

10. The method of claim 7 further comprises:

in response to the favorable write response, receiving a commit command regarding the encoded data slice; and in response to the commit command:
    making the encoded data slice available for accessing; and
    sending a favorable commit response.

11. The method of claim 7 further comprises:

in response to the favorable write and commit response, receiving an undo command; and in response to the undo command, deleting the encoded data slice.

12. A computing device comprises:

an interface;

memory; and a processing module operably coupled to the interface and the memory, wherein the processing module is operable to:
    for a set of encoded data slices to be stored in storage units of a dispersed storage network (DSN), determine a level of confidence regarding a revision level for the set of encoded data slices;
    when the level of confidence is equal to or above a confidence threshold:
        send, via the interface, a set of write and commit requests to the storage units of the DSN, wherein a write and commit request of the set of write and commit requests includes an encoded data slice of the set of encoded data slices, a current revision value, and a new revision value; and
        when a threshold number of favorable write and commit responses have been received from the storage units in a predetermined time period, issue, via the interface, a set of finalize write requests; and
    when the level of confidence is below the confidence threshold:
        send, via the interface, a set of write requests to the storage units of the DSN, wherein a write request of the set of write requests includes the encoded data slice of the set of encoded data slices and the new revision value;
        when a threshold number of favorable write responses have been received from the storage units in the predetermined time period, issue, via the interface, a set of write commit requests; and
        when a threshold number of favorable write commit responses have been received from the storage units in the predetermined time period, issue, via the interface, the set of finalize write requests.

13. The computing device of claim 12, wherein the processing module is further operable to:

prior to sending the set of write requests:
    send, via the interface, a set of check list requests regarding the set of encoded data slices to the storage units, wherein a check list request of the set of check list requests includes a request for a current revision value for one of the set of encoded data slices stored by one of the storage units; and
    determine the new revision value based on check list responses from at least some of the storage units.

14. The computing device of claim 12, wherein the confidence threshold comprises:

a level of certainty regarding the current revision value and the new revision value; and a level of certainty regarding writing priority for the set of encoded data slices.

15. The computing device of claim 14, wherein the level of certainty regarding writing priority comprises one or more of:

information indicating that the computing device has a high probability to be an only device writing the set of encoded data slices; and information indicating that the computing device has a highest priority with respect to writing the set of encoded data slices.

16. The computing device of claim 12, wherein the processing module is further operable to:

when the threshold number of favorable write and commit responses have not been received from the storage units in the predetermined time period, issue, via the interface, a set of undo commands to the storage units.

17. The computing device of claim 12, wherein the processing module is further operable to:

when the threshold number of favorable write responses have not been received from the storage units in the predetermined time period, issue, via the interface, a set of write rollback commands; and when the threshold number of favorable write commit responses have not been received from the storage units in the predetermined time period, issue, via the interface, a set of undo commands.

18. A storage unit comprises:

an interface;

memory; and a processing module operably coupled to the interface and the memory, wherein the processing module is operable to:
    receive, via the interface, a request to store an encoded data slice of a set of encoded data slices;
    determine whether the request is a write and commit request or a write request;
    when the request is the write and commit request:
        compare a current revision value of the write and commit request with a local current revision value associated with the encoded data slice; and
        when the current revision value of the write and commit request is substantially equal to the local current revision value:
            store the encoded data slices in the memory in accordance with a new revision value of the write and commit request;
            make the encoded data slice available for accessing; and
            send, via the interface, a favorable write and commit response; and
    when the request is the write request:
        determine whether a revision value of the write request corresponds to a local revision value associated with the encoded data slice;
        when the revision value of the write request corresponds to the local revision value:
            store the encoded data slice in the memory;

make the encoded data slice unavailable for accessing; and send, via the interface, a favorable write response.

19. The storage unit of claim 18, wherein the processing module is further operable to determine whether the request is the write and commit request or the write request by:

determining that the request is the write and commit request when the request includes both the current revision value and the new revision value; and determining that the request is the write request when the request includes the revision value.

20. The storage unit of claim 18, wherein the processing module is further operable to:

when the current revision value of the write and commit request is not substantially equal to the local current revision value, send, via the interface, an unfavorable write and commit message.

21. The storage unit of claim 18, wherein the processing module is further operable to:

in response to the favorable write response, receiving a commit command regarding the encoded data slice; and in response to the commit command:

make the encoded data slice available for accessing; and send, via the interface, a favorable commit response.

22. The storage unit of claim 18, wherein the processing module is further operable to:

in response to the favorable write and commit response, receive, via the interface, an undo command; and in response to the undo command, delete the encoded data slice.

* * * * *